US 8,125,898 B1

(12) United States Patent
Strayer et al.

(10) Patent No.: US 8,125,898 B1
(45) Date of Patent: *Feb. 28, 2012

(54) METHOD AND SYSTEM FOR DETECTING ATTACK PATH CONNECTIONS IN A COMPUTER NETWORK USING STATE-SPACE CORRELATION

(75) Inventors: William Timothy Strayer, West Newton, MA (US); Christine Elaine Jones, Spokane Valley, WA (US); Rajesh Krishnan, North Billerica, MA (US); Isidro Marcos Castineyra, Somerville, MA (US); Regina Rosales Hain, Winchester, MA (US)

(73) Assignees: Verizon Corporate Services Group Inc., Basking Ridge, NJ (US); Ratheon BBN Technologies, Corp., Cambridge, MA (US)

( * ) Notice: Subject to any disclaimer, the term of this patent is extended or adjusted under 35 U.S.C. 154(b) by 1506 days.

This patent is subject to a terminal disclaimer.

(21) Appl. No.: 11/077,429

(22) Filed: Mar. 10, 2005

Related U.S. Application Data

(60) Provisional application No. 60/554,371, filed on Mar. 19, 2004.

(51) Int. Cl.
| | |
|---|---|
| G01R 31/08 | (2006.01) |
| H04J 3/24 | (2006.01) |
| G06F 15/173 | (2006.01) |
| G06F 11/00 | (2006.01) |

(52) U.S. Cl. ........ 370/230; 370/252; 370/474; 709/224; 726/23

(58) Field of Classification Search .......... 370/229–230, 370/232, 253, 389, 392, 465, 470–471, 474–475; 709/223–225, 232, 249; 726/22–25
See application file for complete search history.

(56) References Cited

U.S. PATENT DOCUMENTS

| | | | | |
|---|---|---|---|---|
| 6,072,800 | A * | 6/2000 | Lee | 370/412 |
| 6,574,669 | B1 * | 6/2003 | Weaver | 709/239 |
| 7,318,105 | B1 * | 1/2008 | Bongiovanni et al. | 709/238 |
| 7,379,993 | B2 * | 5/2008 | Valdes et al. | 709/224 |
| 2001/0014093 | A1 * | 8/2001 | Yoda et al. | 370/389 |
| 2004/0123155 | A1 * | 6/2004 | Etoh et al. | 713/201 |

OTHER PUBLICATIONS

Belenky, A., and Ansari, On IP Traceback. *IEEE Communications Magazine 41*, 7 (2003), 142-153.
Bellovin, S.M., Leech, M., and Taylor, T. ICMP traceback messages. Internet Draft, Oct. 2001. draft-ietf-itrace-01.text (work in progress).
Bloom, B.H. Space/time trade-offs in hash coding with allowable errors. *Communications of ACM 13*, 7 (Jul. 1970), 422-426.
Buchholz, F.P. and Shields, C. Providing process origin information to aid in network traceback. In *Proc. USENIX Annual Technical Conference* (Jun. 2002).
Burch, H., and Cheswick, B. Tracing anonymous packets to their approximate source. In *Proc. USENIX LISA '00* (Dec. 2000).

(Continued)

*Primary Examiner* — Aung S Moe
*Assistant Examiner* — Redentor Pasia

(57) ABSTRACT

A method of determining correlated flows in a network may include obtaining times of arrival and corresponding flows for data units in the network (1020) and assigning weights to a set of data units based on respective times between the set of data units and one data unit (1030). A probability matrix representing interflow connections in the network may be updated based on the assigned weights (1040).

22 Claims, 11 Drawing Sheets

OTHER PUBLICATIONS

Cappe, O., Moulines, E. Pesquet, J.C., Petropulu, A., Yang, X. Long-range dependence and heavy-tail modeling for teletraffic data. *IEEE Signal Processing Magazine 19-3* (2002), 14-27.

Carrier, B., and Shields, C. A recursive session token protocol for use in computer forensics and tcp traceback. In *Proc. IEEE Infocom '02* (Jun. 2002).

Donoho, D.L., Flesia, A.G., Shankar, U., Paxson, V., Coit, J., and Staniford, S. Multiscale stepping-stone detection: Detecting pairs of jittered interactive streams by exploiting maximum tolerable delay. *In Proc. International Symposium on Recent Advances in Intrusion Detection* (Oct. 2002), pp. 14-35.

Egevang, K., and Francis, P. The ip network address translator. RFC 1631, May 1994.

Fan, L., Cao, P. Almeida, J., and Broder, A.Z. Summary cache: a scalable wide-area web cache sharing protocol. *ACM/IEEE Trans. On Networking 8*, 3 (2000), 281-293.

Ferguson, P. and Senie, D. Network ingress filtering: Defeating denial of service attacks which employ IP source address spoofing. RFC 2267, Jan. 1998.

Hazeyama, H., Oe, M., and Kadobayashi, Y. A layer-2 extension to hash-based IP traceback. *IEICE Trans. on Information & Systems*, Nov. 2003.

Howard, J.D. An analysis of security incidents on the internet. 1989-1995. PhD Thesis. Apr. 1997. http://www.cert.org/research/JHThesis/Start.html.

Johns, M. S. Identification Protocol. RFC 1413, Feb. 1993.

Jones, C.E., Tchakountio, F., Snoeren, A.C., Schwartz, B., Clements, R.C., Condell, M., Partridge, C., and Strayer, W.T. Traceback of ip packet transformations. Internal technical memo, BBN Technologies, 2002.

Jung, H.T., Kim, H.L., Seo, Y., Choe, G., Min, S.L., and Kim, C.S. Caller identification system in the internet environment. In *Proc. USENIX Security Symposium* '93 (Oct. 1993).

Lee, S.C., and Shields, C. Tracing the source of network attack: A technical, legal and societal problem. In Proc. *IEEE Systems, Man, and Cybernetics Information Assurance Workshop* (2001).

Libes, D. The Expect home page. Tech. rep., National Institute of Standards and Technology. http://expect.nist.gov/.

Mankin, A., Massey, D., Wu, C.L. Wu, S.F., and Zhang, L. On design and evaluation of "intention-driven" ICMP traceback. In *Proc. IEEE International Conference on Computer Communications and Networks* (Oct. 2001).

Partridge, C., Cousins, D.B., Jackson, A.W., Krishnan, R., Saxena, T., and Strayer, W.T. Using signal processing to analyze wireless data traffic. In Proc. *ACM Workshop on Wireless Security* (*WiSe*) (Sep. 2002).

Paxson, V. Bro: A system for detecting network intruders in real-time. In *Proc. USENIX Security Symposium*, Jan. 1998.

Paxson, V. An analysis of using reflectors for distributed denial-of-service attacks. *ACM Comp. Comm. Review 31.3* (2001).

Perkins, C.E. IP mobility support for IPv4. RFC 3344. Aug. 2002.

Rekhter, Y., Moskowitz, B., Karrenberg, D., De Groot, G.J., and Lear, E. Address allocation for private internets. RFC 1918, Feb. 1996.

Sager, G. Security fun with OCxmon and cflowd. Internet 2 Working Group Meeting, Nov. 1998. http://www.caida.org/projects/NGI/content/security/1198.

Sanchez, L.A., Milliken, W.C., Snoeren, A.C., Tchakountio, F., Jones, C.E., Kent, S.T., Partridge, C., and Strayer, W.T. Hardware support for a hash-based IP traceback. *In Proc. Second DARPA Information Survivability Conference and Exposition* (Jun. 2001), vol. 2, pp. 146-152.

Savage, S., Wetherall, D., Karlin, A., and Anderson, T. Network support for IP traceback. *ACM/IEEE Trans. on Networking 9*, 3 (Jun. 2001), 226-239.

Schnackenberg, D., Djahandari, K., and Sterne, D. Infrastructure for intrusion detection and response. In *Proc. First DARPA Information Survivability Conference and Exposition* (Jan. 2000).

Snapp, S.R., Brentano, J., Dias, G.V., Goan, T.L., Heberlein, L.T., Ho, C.L., Levitt, K.N., Mukherjee, B., Smaha, S.E., Grance, T., Teal, D.M., and Mansur, D. DIDS (distributed intrusion detection system)—motivation, architecture, and an early prototype. In *Proc. National Computer Security Conference* (Oct. 1991), pp. 167-176.

Snoeren, A.C., Partridge, C., Sanchez, L.A., Jones, C.E., Tchakountio, F., Schwartz, B., Kent, S.T., and Strayer, W.T. Single-packet IP traceback. *ACM/IEEE Trans. on Networking* (Dec. 2002).

Song, D.X., and Perrig, A. Advanced and authenticated marking schemes for IP traceback. In *Proc. IEEE Infocom '01* (Apr. 2001).

Staniford-Chen, S., and Heberlein, L.T. Holding intruders accountable on the internet. In *Proc. IEEE Symposium on Security and Privacy '95* (May 1995), pp. 39-49.

Stone, R. CenterTrack: An IP overlay network for tracking DoS floods. In *Proc. USENIX Security Symposium '00* (Aug. 2000).

Wang, X., and Reeves, D.S. Robust correlation of encrypted attack traffic through stepping stones by manipulation of interpacket delays. In *Proc. ACM Symposium on Computer and Communications Security* (*CCS*) (Oct. 2003).

Wang, X., Reeves, D.S., and Wu, S.F. Inter-packet delay based on correlation for tracing encrypted connections through stepping stones. In *Proc. European Symposium on Research in Computer Security* (Oct. 2002), pp. 244-263.

Wang, X., Reeves, D.S., Wu, S.F., and Yuill, J. Sleepy watermark tracing: An active network-based intrusion response framework. In *Proc. International Conference on Information Security* (Jun. 2001), pp. 369-384.

Yoda, K., and Etoh, H. Finding a connection chain for tracing intruders. In *Proc. European Symposium on Research in Computer Security* (Oct. 2000), pp. 191-205.

Zhang, Y., and Paxson, V. Detecting stepping stones. *In Proc. USENIX Security Symposium '00* (Aug. 2000), pp. 171-184.

* cited by examiner

| Time 710 | Source Node 720 | Size/Duration 730 |
|---|---|---|
| 50.001643 | 2 | 40 |
| 50.005243 | 1 | 1000 |
| 50.012309 | 2 | 40 |
| 50.015909 | 1 | 1000 |
| 50.022976 | 2 | 40 |
| 50.026576 | 1 | 1000 |
| 50.033643 | 2 | 40 |
| 50.037243 | 1 | 1000 |
| 50.044309 | 2 | 40 |
| 50.047909 | 1 | 1000 |
| 50.054976 | 2 | 40 |
| 50.058576 | 1 | 1000 |
| 50.060309 | 2 | 40 |
| 50.063909 | 1 | 1000 |
| 50.070976 | 2 | 40 |
| 50.074576 | 1 | 1000 |
| 50.081643 | 2 | 40 |
| 50.085243 | 1 | 1000 |
| 50.092309 | 2 | 40 |
| 50.095909 | 1 | 1000 |
| 50.102976 | 2 | 40 |

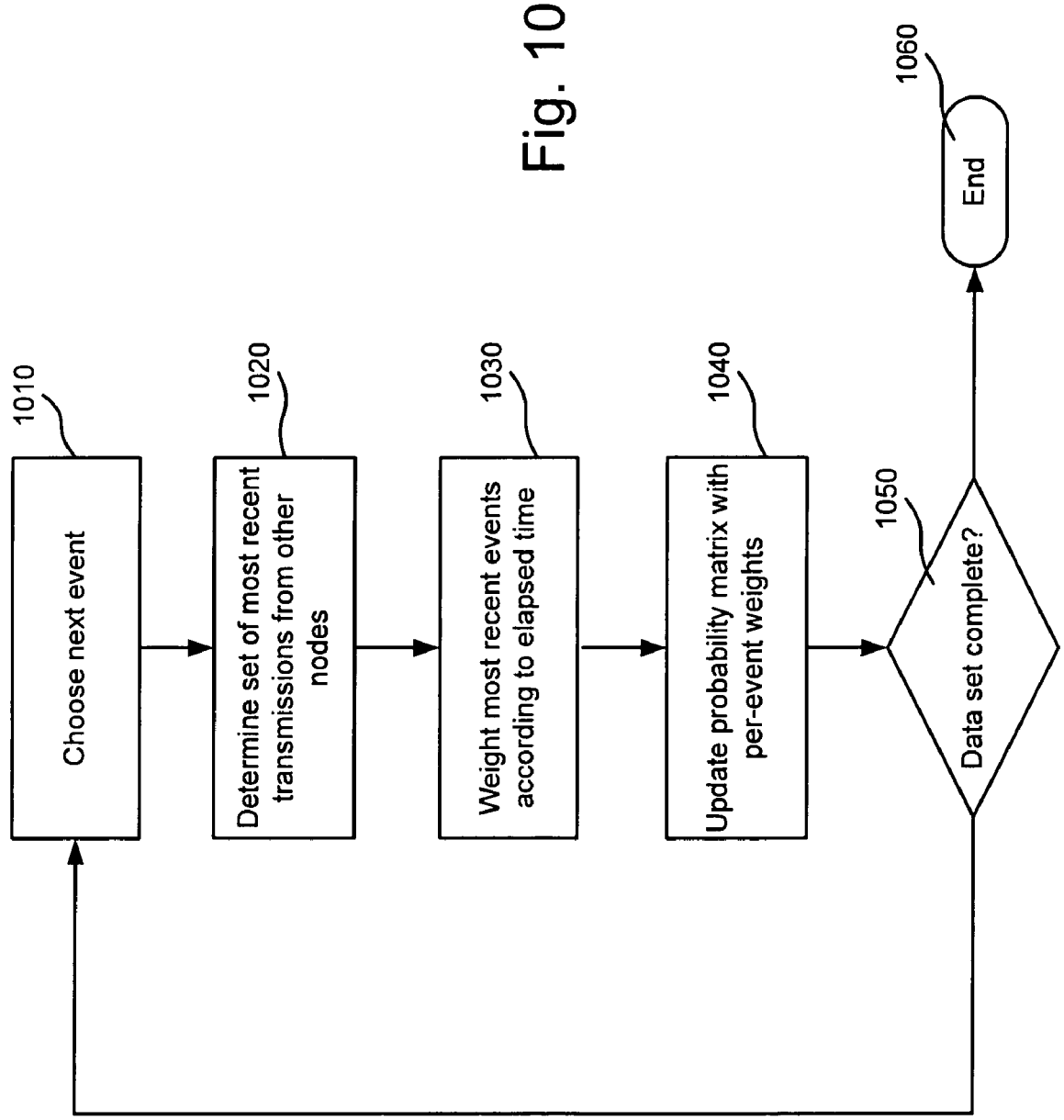

METHOD AND SYSTEM FOR DETECTING ATTACK PATH CONNECTIONS IN A COMPUTER NETWORK USING STATE-SPACE CORRELATION

CROSS-REFERENCE TO RELATED APPLICATIONS

The present application claims priority to U.S. Provisional Patent Application No. 60/554,370, filed Mar. 19, 2004, the entirety of which is incorporated by reference herein.

GOVERNMENT INTEREST

The invention described herein was made with government support. The U.S. Government may have certain rights in the invention, as provided by the terms of contract No. N66001-00-8038, awarded by the National Security Agency (NSA).

BACKGROUND

1. Field of the Invention

Systems and methods consistent with the principles of the invention relate generally to communication networks, and more specifically, to the discovery of routes used by data transmitted over such networks.

2. Description of Related Art

The Internet or any accessible computer network is, and likely will for quite some time remain, vulnerable to malicious attacks. In spite of the development of many sophisticated defense mechanisms such as intrusion detection systems and firewalls, such malicious attacks continue to increase. This is due in part because of a perceived lack of accountability: the anonymous nature of the Internet and its protocols make it difficult to accurately identify the source of a network attack when the perpetrator wishes to conceal it. In fact, an attacker can generate attacks that appear to have originated from anywhere or nowhere.

Accordingly, there exists a need for methods and systems for effectively identifying stepping stones or correlated connections in an extended connection attack path.

SUMMARY OF THE INVENTION

Systems and methods consistent with principles of the invention may identify correlated flows in a network which may be related to a network attack. In one implementation, a data set including times of arrival and flow identification information may be obtained for data units in the network. Most recent data units before a data unit arrival time associated with a flow of interest may be identified for other flows than the flow of interest. Weights may be calculated for the other flows based on time differences between the data unit arrival time associated with the flow of interest and the most recent data units. A probability matrix may be updated based on the weights for the other flows. Identifying, calculating, and updating may be repeated for other times of arrival and associated flows of interest in the data set. It may then be determined whether a flow is a stepping stone in an attack path based on the probability matrix.

In another implementation consistent with the present invention, a method of determining correlated flows in a network may include obtaining a set of times of arrival and corresponding flow identification information for data units in the network. Intervening times between one data unit from one flow and recently arriving data units from other flows may be determined. Correlation probabilities between the one flow and the other flows may be generated using the intervening times.

In a further implementation consistent with the present invention, a method of determining correlated flows in a network may include obtaining times of arrival and corresponding flow identification information for data units in the network and assigning weights to a set of data units based on respective times between the set of data units and one data unit. A probability matrix representing interflow connections in the network may be updated based on the assigned weights.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 is an exemplary tracefile according to an implementation consistent with the present invention;

FIG. 10 illustrates exemplary iterative processing to generate and update the cumulative probability matrix of FIG. 5;

DETAILED DESCRIPTION

Figure 1:
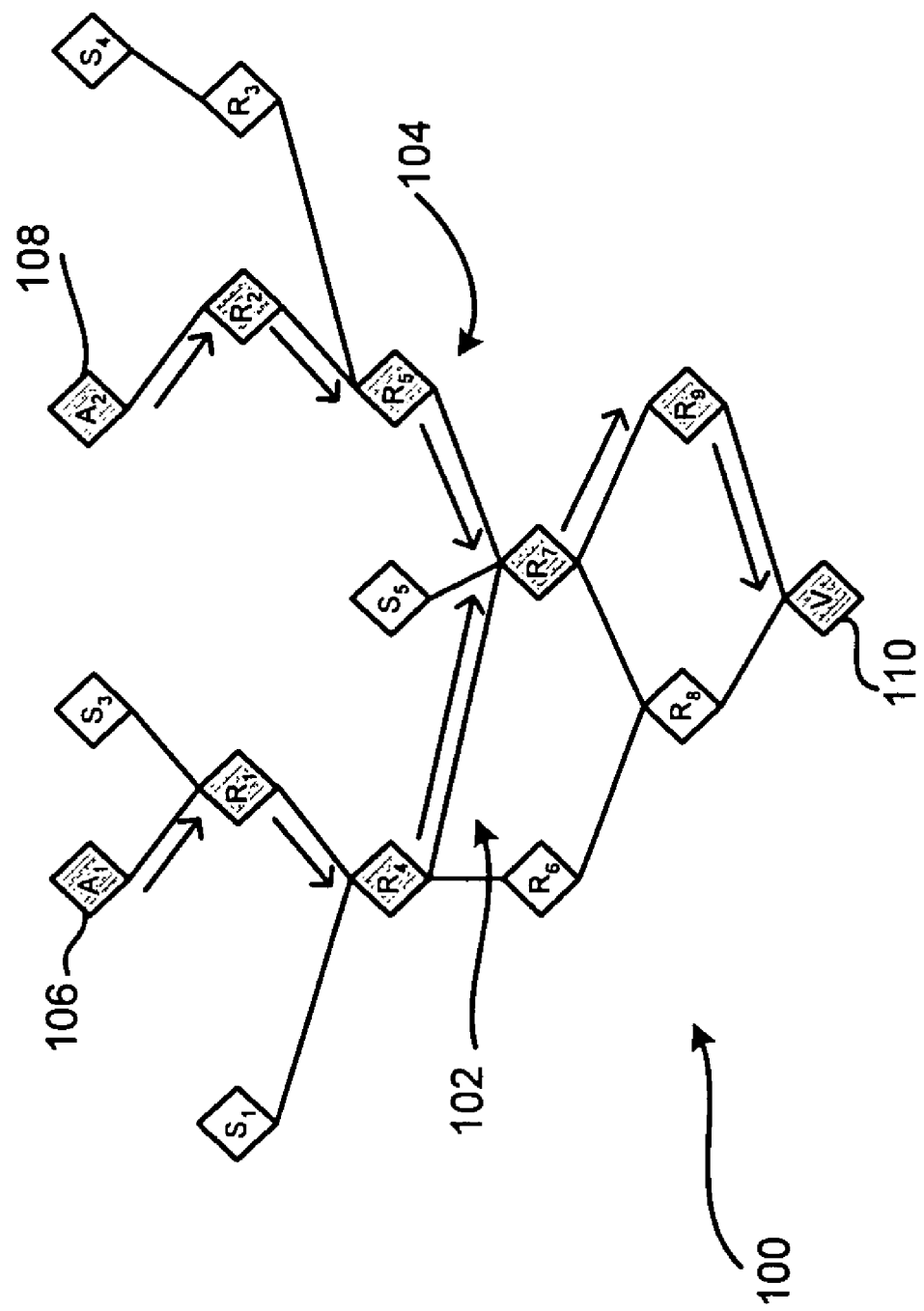
FIG. 1 is an attack graph containing exemplary attack paths for two identical packets.

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Overview

There are several reasons why computer networks, especially the Internet, are particularly prone for attacks. First, since networks facilitate remote operations, an attacker may be physically separated from the target. This separation provides some degree of protection. Second, the design of the Internet emphasizes fault tolerance, efficiency, and usefulness over accountability. The legitimacy of IP source addresses is not universally enforced. Routing algorithms are purposefully stateless to facilitate rapid recovery or rerouting of traffic after failure. Login identifiers also hide identity.

Rather than being the true name of the individual, it is a handle without a strong binding to any real identifying properties at all. In fact, the lack of a strong binding of user-to-individual is a universal problem, and techniques like PKI (public key infrastructure) seek to make identity and authentication based on identity an integral part of the network. So far, such efforts have failed to achieve traction.

Finally, the sociological aspects of the Internet support the establishment and maintenance of loosely coordinated subcultures, complete with group dynamics and peer pressures, some of which reward daring feats. From chat rooms to hacker and cracker communities, individuals say and do things they may never attempt off-line because they have created an alter-ego for their presence on-line, where real names and identities are not being revealed.

Anonymity is a liberating differentiator. Inhibitions are relaxed when the fear of being identified is reduced or removed. This is true for most social situations, but more nefariously, anonymity emboldens individuals with ill intentions to act in destructive ways. Often, network-based attacks are perpetrated by individuals seeking to hide their identities. One of the simplest ways to remain anonymous is to hide the source of an attack by chaining together multiple connections into an extended connection. This is typically done by logging into a remote host, then from there logging into a third and fourth and so on until, at the final host, an attack is launched. These intermediate hosts are often referred to as "stepping stones." Tracing such an attack back to the original source is difficult. Some techniques exist to trace individual connections. However, tracing an extended connection requires identifying related connection pairs at each stepping stone.

The attribution problem may be broken into two parts: (1) finding the source of a flow of attack packets, called the IP Traceback Problem, and (2) discovering which sources are acting to launder the attack, called the Stepping Stone Problem. Consequently, three types of attack sources may be identified: an originating source, stepping stones, and immediate sources. The originating source of an attack, also referred to as the attack source, is the point of origin from which the attacker injects traffic into the network. In the presence of an extended connection, the originating source is the host that initiates the first connection in the connection chain. Stepping stones include intermediate hosts (or routers acting as hosts) along the traversed path of an attack that are exploited to conceal the originating source. The immediate source is the actual host to issue a packet and is also referred to as the packet source. The immediate host may be either the originating source or an intermediate stepping stone.

The ability to identify the immediate source of packets is a necessary first step in identifying the originating source of an attack. Yet identifying a packet's source is complicated by both legitimate actions taken upon the packet by the routers as well as the always-present possibility of malicious actors along the packet's path.

The result of a packet traceback is called the attack path and consists of each router traversed by the packet on its journey from source to the victim. Unfortunately, packet traceback may identify multiple attack paths. This can happen for two primary reasons. First, a compromised router can fabricate trace information such that multiple (but incorrect) sources are named. Second, multiple indistinguishable packets may be injected into the network from different, but legitimate, sources, possibly to confound the traceback system. Therefore, a traceback system should construct an attack graph composed of one or more attack paths, as shown in FIG. 1. In FIG. 1, an attack graph 100 is shown containing attack paths 102 and 104 for two identical packets injected by host attackers A1 106 and A2 108 and received by the victim, V 110. The arrows indicate links traversed by the packet and the nodes on an attack path are shaded accordingly.

IP packets may be modified during the forwarding process. In addition to the standard decrementing of the time to live (TTL) field and checksum recomputation, IP packets may be further changed by intermediate routers. Packet transformations may be the result of valid processing, router error, or malicious intent. Packet transformations resulting from errors or malicious behavior need only be traced to the point of transformation, since the transforming router either needs to be fixed or can be considered a co-conspirator.

In the presence of subverted routers, an attack graph may incorrectly identify a host as being the source of malicious packets; that is, an attack graph may contain false positives. This is an unavoidable consequence of admitting the possibility of subverted routers and tradeoffs between accuracy and resources. While attempting to minimize false positives, an ideal traceback system should produce no false negatives; that is, it should never exonerate an attacker by not including the attacker in the attack graph.

Figure 3:
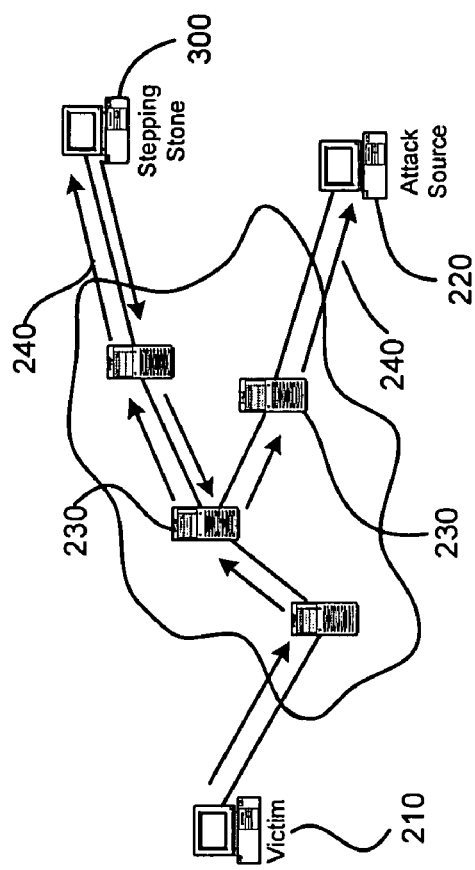
FIG. 3 is a is a diagram illustrating an exemplary network according to another implementation consistent with the present invention.
Figure 2:
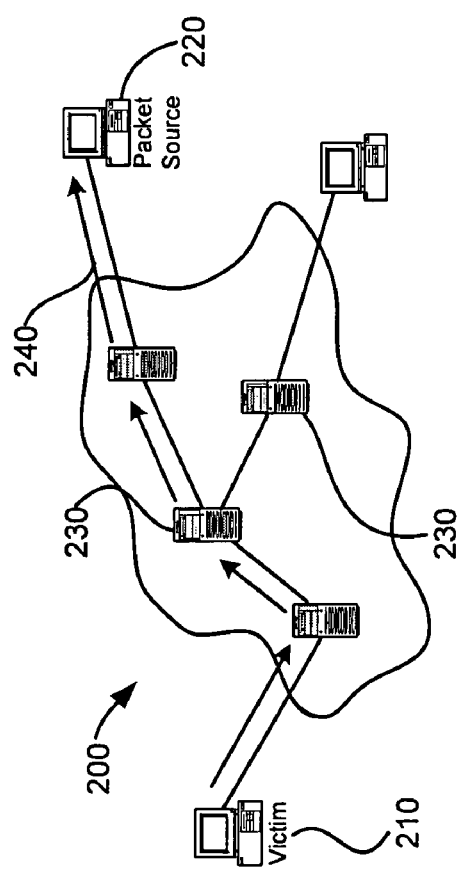
FIG. 2 is a diagram illustrating an exemplary network according to an implementation consistent with the present invention.

The IP traceback systems identified above are oriented to packet tracing. They aim to produce an attack graph showing the path of one or more packets through the network, as shown in FIG. 2. FIG. 2 is a diagram illustrating an exemplary network 200 traversed during a network attack. Network 200 includes a victim host 210, a packet source host 220 and several intermediate routers 230 which facilitate movement of the attack from the source to the victim. As discussed above, an IP traceback 240 that reaches a host has identified a potential source of a packet. However, this does not mean that the source of the attack has necessarily been determined. As shown in FIG. 3, the host may actually be a stepping stone host 300 mid-stream of the actual attack path.

Tracing an attack path through stepping stone hosts requires the discovery of an association between two connections with endpoints at that host such that these connections act as consecutive links in a chain of connections. The chain of connections between an originating (or attack) source and the victim form what is called an extended connection.

An extended connection is constructed by a series of individual connections linked in a pairwise fashion and related by carrying the same underlying data (carried as plaintext or encrypted text) serially across each connection from the originating source to the ultimate destination. A connection pair includes any two adjacent connections in the extended connection—that is, of the four endpoints of the two connections, two endpoints are the same host.

Once an extended connection has been identified, the attribution process turns to identifying two connections as related links in a larger chain of connections. Three classes of intermediate hosts may be used by an attacker to launder attack data and to obfuscate the attack path: stepping stones, zombies, and reflectors. An extended connection employed for launching an attack may involve any type and any number of such intermediate hosts.

The simplest type of intermediate host is a stepping stone host. Such a host is compromised to the extent that the attacker can log into the host and establish an outgoing interactive connection (such as telnet, rlogin, or ssh) to the next host in the attack path. The attacker's communications are not fundamentally altered, though enough may change to evade some methods of detection. For instance, if one or both connections are established using ssh, encryption will prevent use of any traceback method based on packet content. Processing delays in the host may superficially alter timing of packets. An attacker will usually chain multiple stepping stones together to further screen the attack's origin.

An attacker need not deeply compromise a host to create a stepping stone. All that is needed is access to an ordinary user's privileges to log in and make outgoing connections. Such access can be gained, for instance, by dictionary attacks on password files or by snooping for passwords in Internet cafes or computer labs. Root access (or equivalent) is rarely required, though a more permanent back door could be more easily established with such privileges.

One difficulty with the detection of stepping stones is the large number of legitimate uses of extended connections. Commonly, access to hosts by legitimate users from outside a network is via a trusted gateway host through which the users connect to the target host. And frequently, by habit if for no other reason, a user will casually connect to some other host as needed by beginning a new session from his current target host.

Another type of intermediate host may be an intermediate host at which incoming communication is transformed such that the resulting outgoing communication appears to be wholly unconnected, and delays measured in hours or days are introduced prior to the establishment of the outgoing communication. Such behavior defines a zombie host. The attacker's incoming communication may be script and code to install a Trojan, and the attack output might come days or months later (say in response to a cron table entry). Another zombie may accept simple trigger commands from the attacker to execute previously planted code that issues entirely different output, for instance as part of a distributed denial-of-service (DDoS) attack.

The lack of apparent relationship between the incoming attack stream and the outgoing attack data, as well as the extremely long interval that may ensue between the end of one and the start of the other, makes the traceback problem in the network a very difficult one. Consider the example of a DDoS attack being triggered by a timer. Once the attack is under way, it is generally easy to determine the immediate source of the last link or two in the attack path. But once the zombie running the Trojan script is identified, it is difficult to associate the attack output with the incoming communication that generated the attack. Since the incoming connection (over which the Trojan was downloaded and installed) could have existed weeks or more in the past, the network retains no information about it. An investigator must examine host logs, if access can be obtained, and even then a cleverly written Trojan may have altered those logs when installed. Even if the DDoS attack is initiated by a packet containing a trigger command, there may very likely be insufficient data to associate that trigger packet with the outgoing attack connection.

It is also possible to launder an attack through an innocent, intact host operating normally, by using it as a reflector. For instance, an attacker logged into a host (possibly as part of an attack chain) may generate packets with the IP address of the ultimate attack victim forged as the source of the packets. The response packets are directed to the victim and constitute the actual attack. By bouncing such spoofed packets off a large number of normally operating reflectors, massive quantities of bogus responses are directed at the victim. This attack must be detected in the network, as there is no need for the attacker ever to have communicated with the reflector to set up the attack, hence no evidence of the attack or any tampering can be found on the host.

Without loss of generality, an attacker may be considered as being "upstream" and its victim as being "downstream," and the direction of a connection as being toward the victim, i.e., "going downstream." This is a convention without regard to whether a detection method examines unidirectional or bidirectional connections.

Figure 4:
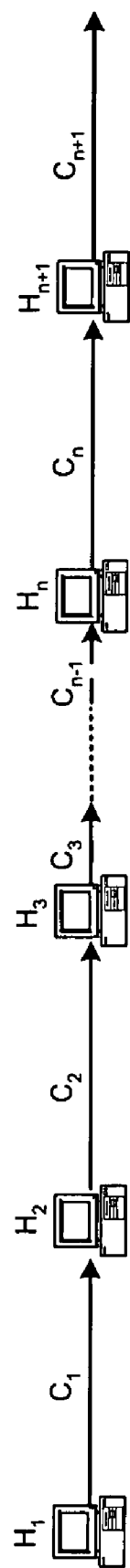
FIG. 4 is a chain of connections showing directionality between hosts.

Assume that an attack path includes connections chained together between a number of hosts, as shown in FIG. 4. The hosts to the left are the initiators of the connections, and are considered "upstream," while the hosts to the right are the targets of the connections and therefore are considered "downstream." More specifically, $C_1$ represents the connection from host $H_1$ to host $H_2$, $C_2$ the connection from $H_2$ to $H_3$, and so on. IP traceback techniques provide a way of identifying the host $H_n$ that is the immediate source of attack packets arriving at host $H_{n+1}$ on connection $C_n$. This trace may further be extended by identifying upstream connection $C_{n-1}$, on the attack path and continuing back up the chain of connections to discover the attacker.

In general, this is accomplished by examining all the incoming connections at $H_n$, to associate one of them with $C_n$. This is done by examining some set of characteristics of the outgoing stream of packets comprising $C_n$ and searching for an incoming stream of packets with matching characteristics. The correlation between each of these incoming streams and $C_n$, can be computed in various ways, and the best match that achieves more than some minimum correlation is the most likely candidate for connection $C_{n-1}$.

The above is an example of direct correlation, where both connections have an end-point in common. There is also the concept of indirect correlation. Assume that $C_i$, $C_{i+1}$ and $C_{i+2}$ are consecutive connections in the attack path. Further, suppose there is not sufficient access to the network(s) or routers traversed by $C_{i+1}$ to install or access tools capable of reporting on the connections. It may still be possible to correlate the packet stream of $C_i$ as it leaves host $H_i$ for $H_{i+1}$ with some other packet stream on a connection exiting host $H_{i+2}$ for $H_{i+3}$. If so, this second connection may be considered as a likely candidate for $C_{i+2}$. For such an indirect correlation, the criteria for deciding that the correlation is significant are likely to be different from those for a direct correlation.

There are a number of connection characteristics which may be compared in an attempt to determine whether two or more connections are correlated. If $C_i$ and $C_j$ are connections in an attack path, any characteristic which remains unchanged at the intermediate host or hosts between them—or, in other words, is invariant—may be used to determine if two such connections are associated. The only truly invariant relationship between correlated connections is causality. A packet or event on $C_i$ must occur earlier in time than the corresponding packet or event on a downstream connection $C_j$, or no correlation can exist. However, accurately establishing causality depends on precision of clocks and relative timing error between networks.

Other characteristics of connections that may be analyzed for correlation are separated into two main categories: content and timing. Two connections in a chain may contain nearly identical sequences of data bytes, assuming there is no encryption. Even so, there may be some variations (consider that one connection may use telnet while another uses rlogin) due to differing sequences of protocol options, or bytes being repackaged differently into packets. Nevertheless the main part of the stream of data bytes will be nearly identical. Use of encryption in a connection (using ssh, for instance) removes the possibility of correlation by content. However, depending on the type of cipher, packet size or byte count over time may still be a variable that can be correlated between connections.

Timing characteristics are not affected by encryption or any other transformation of the content. Variables available for analysis include the transmission times of packets or bytes, start time and lengths of packet bursts, and start and end times of idle periods.

Yet, the content and timing characteristics are not completely invariant between connections in a chain. Connection content and timing may be transformed at intermediate hosts, even with the simplest of stepping stones. Some transformations are "naturally occurring"—processing or propagation delay variations, for instance. However, application-level processes at intermediate hosts may be deliberately modified or created to transform connections with the goal of complicating the correlation process. Transformation of connections causes the algorithms used to detect correlated connections to produce results that are somewhat imprecise. The correlation between two connections is, thus, an indication of the probability that the connections are associated in an attack path. Consequently, reduction of false positives should be a consideration of any technique developed to detect correlated connections.

Methods and systems consistent with the principles of the invention may discover correlated flows by examining elapsed times between the arrival of one grouping of information or packet (generally referred to hereinafter as a data unit) and the most recent data unit arrivals from other flows on a per-event basis. The most recent data unit arrivals from the other flows may be weighted so that more recent data units are weighted higher than less recent data units.

Exemplary Network Configuration

Figure 5:
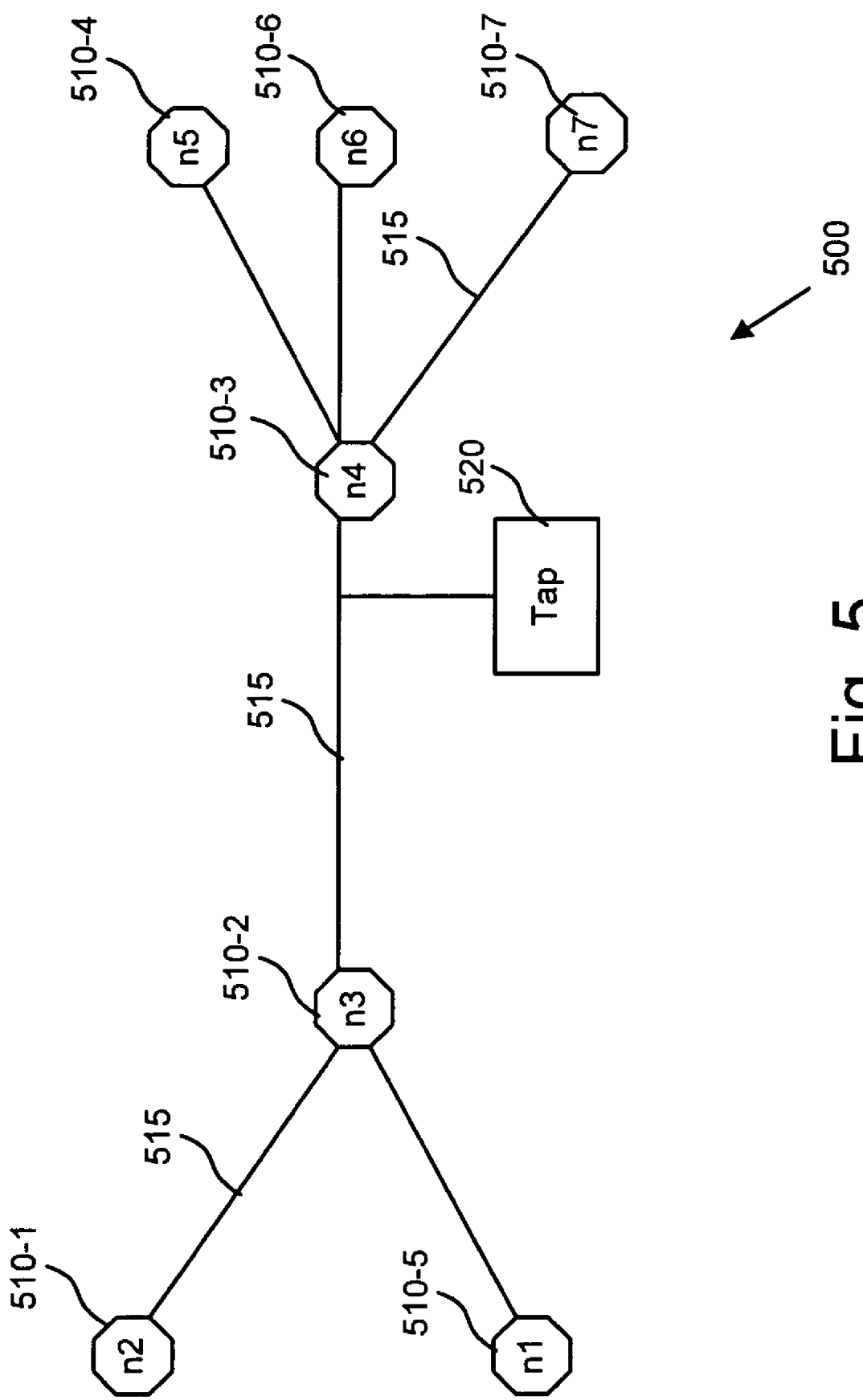
FIG. 5 is a diagram illustrating an exemplary network and tap according to an implementation consistent with the present invention.

FIG. 5 is a diagram illustrating an exemplary network 500 according to an implementation consistent with the present invention. Network 500 may include a number of network nodes 510-1 ... 510-$n$ (collectively "nodes 510") connected by a number of network links 515. Network 500 may also include one or more network taps 520. Taps 520 may reside on a network link (e.g., ethernet), in a host, or in a router—any point where traffic from different places pass. Although seven nodes 510 and one tap 520 are shown connected in a particular configuration, this is purely exemplary. Network 500 may include any number and configuration of nodes 510, links 515, and taps 520.

Network nodes 510 may be configured to send and receive flows of information according to a communication protocol, such as TCP, UDP, etc. Although not specifically shown, some nodes 510 may be configured to generate a route for information to a specified destination. Other nodes 510 may be configured to send the information according to a previously-determined route. Network nodes 510 may communicate via discrete data units of data that are transmitted by sending nodes 510. A data unit may be any individually detectable or distinguishable unit of data. Data units may be transmitted in flows originating from node 510. A listening device, such as tap 520, may determine when a data unit starts and ends. As alluded to above, a data unit need not exactly correspond to a packet of data. Rather, a data unit may represent part of a packet (e.g., a fragment or an ATM cell of an AAL5 PDU), or multiple packets (e.g., two packets concatenated).

Network links 515 may include electronic links (e.g., wires or coaxial cables) and/or optical links (e.g., fiber optic cables). These links 515 may provide a connection between two nodes 510 (e.g., nodes n1 and n3). It may be possible to physically tap into these links 515 to observe the information carried on them.

Network tap 520 may include a device that intercepts data unit transmissions on network 500. Tap 520 may include a physical connection to a corresponding link 515 and circuitry to detect data units on link 515. Tap 520 may intercept data units at a physical layer, a link layer, a network layer, or at higher layers of network 500 being monitored. The layer at which interceptions occur is within the abilities of those skilled in the art, and may be chosen based on knowledge of, and access to, network links 515. Tap 520 may include, for example, a transceiver for sensing the data units and may also include other circuitry (e.g., clock circuitry) for determining times of arrival and duration of the data units. Tap 520 may include a processor for computing any other information associated with the data units, such as information contained within a header of the data units (e.g., identity of a sending node and/or receiving node).

Tap 520 may observe traffic on link 515 between nodes n3 and n4. Tap 520 may record information about all the data units that it observes in a "tracefile." The tracefile may contain a minimum amount of information for each observed data unit. For example, the information may include the time the data unit was seen and the identity of the data unit's flow (i.e., the gouping of data units to which it belongs). If available, the tracefile may also include additional information about the length or duration of the data unit, destination node 510, or any insight into the contents of the data unit. Other information that may be available is the location of tap 520 along link 515 relative to nodes 510 at either end of link 515.

Tap 520 may not capture all traffic on link 515. For example, tap 520 may occasionally make an error and mistakenly believe it has seen a data unit when no data unit was sent (e.g., due to bit errors on network 500). If transmissions are missed, false transmissions are detected, or if a sender 510 is misclassified, these events may be viewed as adding noise to the signals generated by tap 520. Other sources of noise in the signal generated by tap 520 may include interference from other signals (e.g., packets belonging to another flow, or jitter in timing due to sharing of a bottleneck among multiple flows).

Tap 520 may listen passively and may not participate in network 500 at the MAC (or higher) layers. In some cases, for example with 802.3 LANs, it is possible for tap 520 to snoop at the MAC layer and extract some information about higher layer protocols. In the case of SONET networks, however, little or no information may be available about the MAC or higher layer protocols. Such passive listening may also be referred to as covert information collection.

Although a single tap 520 is shown in FIG. 5, network 500 may contain many taps 520, which may be interconnected, thereby enabling effective knowledge collection for a variety of network links 515. Taps 520 may work independently using purely local information. Distributed algorithms may allow sharing of information among taps 520. In such a case, taps 520 may have a globally synchronized clock that allows information from multiple taps 520 to be combined. A clock resolution of taps 520 may be finer than the data sampling resolution of taps 520, so that information about transmissions (e.g., the start time, duration, inter-transmission gap, and even the presence of short transmissions) is not missed.

A tap 520 (or a network of taps 520) should store the transmissions that it detects for a sufficient amount of time. For example, the round-trip time of a transport layer flow cannot be determined if the history that may be stored at tap 520 is less than one roundtrip time. The total volume of data that is stored depends on the capacity of link 515 and the maximum round-trip time of flows seen on link 515. Taps 520 may assign a unique identifier to each sender 510, for example, based on the address of the IPsec gateway. Taps 520 in the network 500 may assign the same unique identifier to any given sender 510.

Exemplary Stepping Stone Discovery Processing

The topology discovery processing described below is primarily applicable to wired networks 500, so the discussion will be described with respect to wired networks 500. The techniques discussed herein, however, are not limited to such networks, and also may be applied to wireless or other types of networks.

Figure 6:
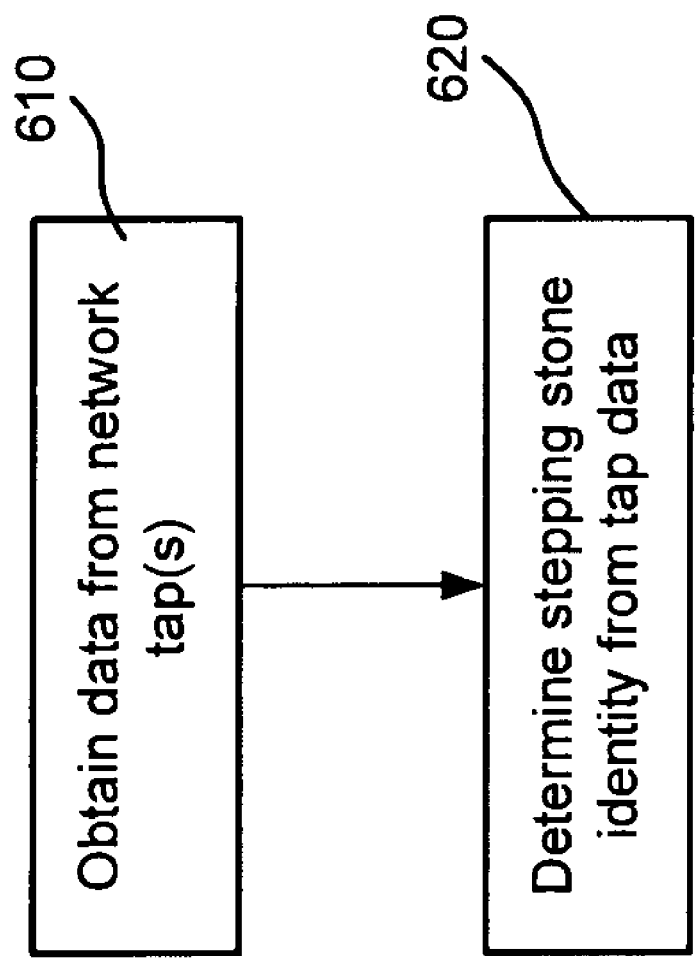
FIG. 6 is an exemplary flow chart of network topology discovery processing in the network of FIG. 5.

1. Obtain Tap Data:

FIG. 6 is an exemplary flow chart of route discovery processing in network 500. Processing may begin with one or more taps 520 obtaining data from its respective network link 515 [act 610]. The tap(s) 520 may obtain data over a period of time, and may store this tap data in a tracefile. The tracefile may represent discrete events, namely a sequence of events associated with different times. The tracefile may include other information (e.g., sender information) associated with the events.

FIG. 7 illustrates an exemplary tracefile 700 according to an implementation consistent with the principles of the invention. Tracefile 700 may include times of arrival 710 of data units (e.g., packets). Tracefile 700 also may include flow identifying information 720 for each data unit arrival.

Another piece of information that the tap 520 may obtain is identification of the flow 720 related to the data unit. The flow identifying information 720 may be obtained even if the data unit is otherwise encrypted. Although designated as flows "1" and "2" in FIG. 7, the flow identifying information 720 may be source and destination IP addresses, port numbers, etc.

Tap 520 may, if available, obtain other information from intercepted data units, such as any field from an IP header associated with the data unit, a destination node for the data, and/or a type of the data unit. Those skilled in the art will appreciate additional information in addition to the above examples may be directly or indirectly obtained by tap 520. For the stepping stone discovery processing described herein, however, the time of arrival information 710 and flow identifying information 720 of a data unit may be sufficient information with which to discover the attack stepping stones of network 500.

2. Determine Correlated Flows:

Returning to FIG. 6, either the tap 520 or an associated (possibly central) processor (not shown) may determine any correlated flows (i.e., stepping stones) or activity within network 500 from the tap data in all tracefiles (or a single tracefile) for a period of time [act 620]. A single tracefile may provide the "local" topology that may be sensed from a single tap 520. By contrast, the aggregation of all tracefiles from all taps 520 in the network 500 may contain much more sensed network traffic within a given time period.

The underlying approach for stepping stone discovery may be based on fundamental assumptions about the recorded traffic flows from the perspective of a given event (i.e., packet transmission). Observation and experimentation with tracefiles 700 may produce two characteristics of traffic flow structure from a tap 520's perspective. First, the likelihood of an event (designated as a recorded entry in the tracefile 700) being a response to a prior event decreases as the elapsed time between the two events increases. Second, in accordance with principles of the invention, the inter-arrival times between a fixed event and any other event may be modeled as being a Poisson distribution.

The first characteristic may be seen as a direct consequence of causality (i.e., in networks, transmissions are generally in response to other transmissions) with the added stipulation that a network tries to operate efficiently. Loosely speaking, related packets are expected to be located temporally closer than unrelated ones.

Accordingly, it has been determined that the second characteristic (i.e., that a stationary time series assumption is valid) holds when the so-called Hurst parameter is less than approximately 0.5. Those skilled in the signal processing arts will understand how to measure and quantify the Hurst parameter for tracefile data. In practical application, tracefile data should not be aggregated beyond a relatively short time, such as about 4.5 ms. The average inter-event times for most networks occur on the order of 1 ms, which falls comfortably within the time scale where traces can be characterized by classical second-order statistics, such as the Poisson distribution. For such tracefile data, the use of a constant Poisson parameter $\lambda$ approximates inter-arrival times between events relatively accurately.

Although the probability distribution of inter-event arrival times is described as a Poisson distribution herein, such a probability distribution function is presented purely for ease and clarity of description. In practice of the principles of the invention described herein, any discrete event probability function may be employed. As one example, a "Poisson mixture" (i.e., a linear combination of Poisson distributions) may be used. Those skilled in the art will understand, in view of this specification, that any other discrete event probability function that corresponds to available or likely tap data may be used.

The state-space technique computes the degree at which two (or more) different traces are related using windowed time-frequency techniques, such as cross spectral densities or its normalized counterpart, cross-coherence, to capture variations in the signal relationships as they evolve over time. Alternatively, a single trace having two or more flows associated with it may also be analyzed in accordance with the present invention. This technique considers the structure of all recorded traces from a purely causal perspective. The underlying approach is based on fundamental assumptions about the recorded traffic flows from the perspective of a given event (transmission), rather than from the perspective of the network node.

The state-space algorithm is based upon two assumptions. First, the likelihood of a flow being responsive to a prior flow generally decreases as the elapsed time between them increases. This is a direct consequence of causality with the added stipulation that a network tries to operate efficiently. Loosely speaking, it may be expected that related packets be located (temporally) closer than unrelated ones. Second, the inter-arrival times between a fixed event and any other event are approximately Poisson distributed.

The algorithm uses a state-space representation of the flows to generate a conversation probability matrix (CPM) representing interflow connections in the network. The state vector of flow j is updated at each detected transmission by flow j by computing a weighted sum using the previous state vector and a new weight vector $W_j$, including weighted contributions from each flow i. Each resulting i, j is an entry in the CPM and corresponds to the probability that the connection associated with flow j is due to one generated previously by flow i. One further aspect of the algorithm results from the causality constraint: the weight for flow i is set to zero if an instigating transmission from flow i ended after the start of the current transmission from flow j.

When processing tracefiles 700, the first characteristic may be implemented in the following manner. The number of flows, n, in network 500 may be obtained from tracefile 700. To represent the "event-centric" state of the network 500 as a function of time, a matrix T(t) may be defined:

$$T(t)=(t^*_i)\ i=1,\ldots n, \tag{1}$$

where $T(0)=0$, $t_i^*$ is the arrival time 710 of the most recent event (ending $<t$) for node i 720. From an implementation standpoint, the matrix T may be updated on a per event basis by filling an appropriate row of T (e.g., with the data from tracefile 700).

From a mathematical perspective, and with reference to T, a packet $p_k$ may occur at time $t_k$ from flow $n_k$. Using this terminology, the time interval $\tau_i^k$ between the end of the transmission of the last packet on flow i until time $t_k$ may be defined as:

$$\tau_k^i = t_k - [t^*_i]\equiv t_k - (T(t_k))_i\cdot[1,1]^{transpose} \tag{2}$$

Then a weight, $W_{pk}^i$ (between 0 and 1) that quantifies the likelihood that this packet $p_k$ is a reaction to a prior packet from flow i, may be represented as follows:

$$W_{pk}^i \equiv W(\tau_k^j) = \begin{cases} e^{-\lambda \tau_k^j} & \text{if } \tau_k^j > 0 \\ 0 & \text{otherwise} \end{cases} \tag{3}$$

The first case of $W_{pk}^i$ corresponds to assigning an exponentially decaying ($\lambda>0$) weight according to how much time has transpired since flow i last transmitted, that is, the time interval $\tau_k^i$. The second case of $W_{pk}^i$ above ensures causality (i.e., one flow may not react to a second flow before the second flow finishes transmitting). Thus, a weight of zero is assigned when the time interval $\tau_k^i$ is less than 0 (i.e., when there is some overlap in transmission duration).

The constant Poisson parameter $\lambda$ may then be determined by applying the second assertion from above, that the probability that packet $p_k$ is due to flow i assuming a Poisson random variable time delay t, or, symbolically:

$$P(e_k \text{ due to flow } i)=P(t>\tau_k^i)=1-P(t\leq \tau_k^i), \tag{4}$$

which is simply $e^{-\lambda\tau_k^i}$, where $\lambda$ is the Poisson parameter. Thus, by estimating $\lambda$, probabilities can be assigned concurrently with the calculations of equation 3 at no additional computational expense.

Figure 8:
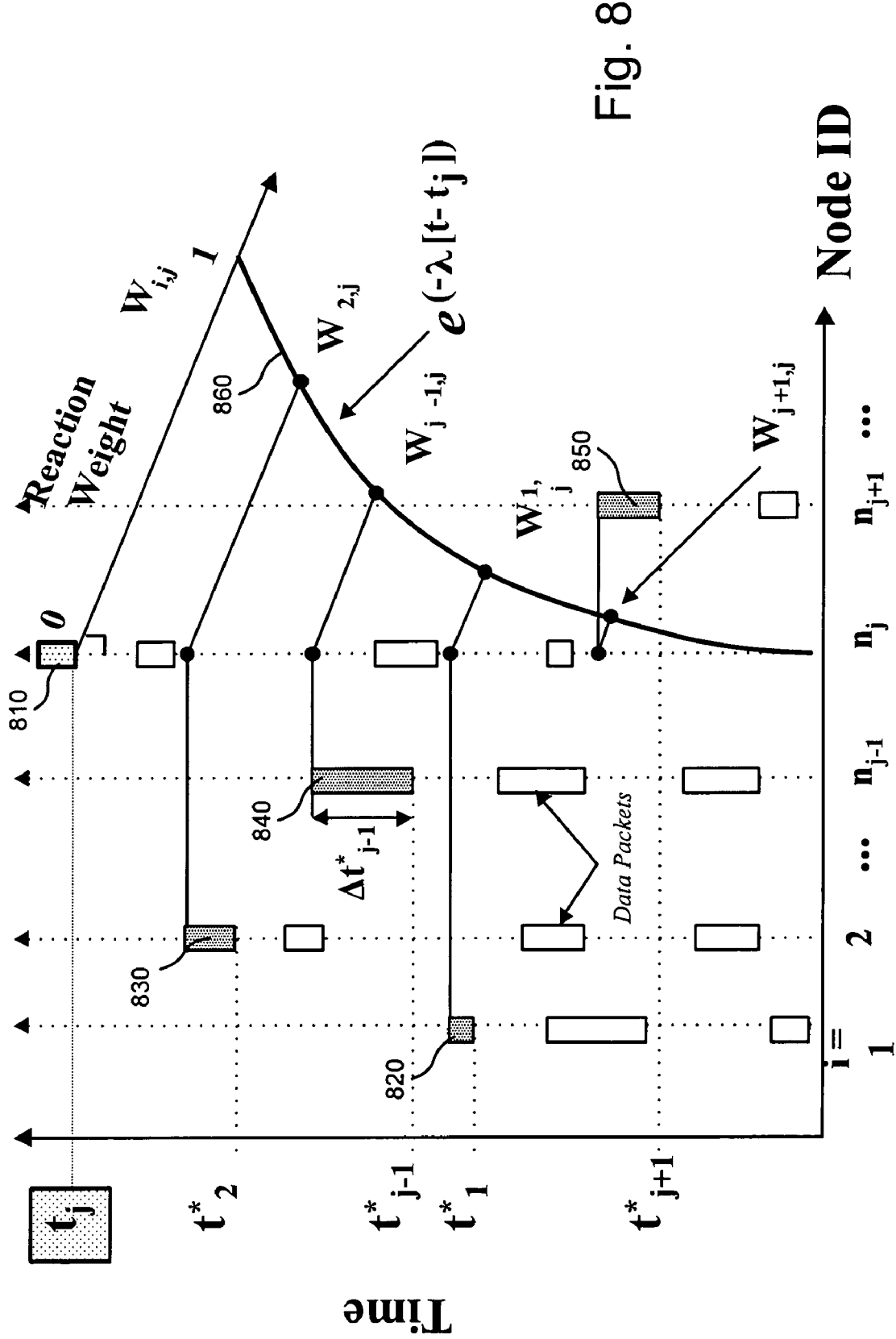
FIG. 8 is plot of arrival times for different flows that illustrates the generation of weights for one data unit arrival event.

FIG. 8 is plot of data unit (e.g., packet, cell, etc.) arrival times for different flows that illustrates the generation of weights for one data unit arrival event. The arrival packet of interest $p_j$ 810 occurs at time $t_j$, and its source was flow $n_j$. Earlier events from source flow $n_j$ and other flows (e.g., $n_1$ to $n_{j-1}, n_{j+1}$, etc.) are shown as rectangles beginning and ending at certain times above their respective flows. The most recent data unit arrival events $e_1$, $e_2$, $e_{j-1}$, and $e_{j+1}$ from other flows $n_1$, $n_2$, $n_{j-1}$, and $n_{j+1}$ are shaded and respectively labeled 820, 830, 840, and 850.

Curve/function 860 conceptually illustrates the calculation of weights $W_{pk}^i$ using equation 3 above. Curve/function 860 is shown in a third "weight" dimension along the vertical line corresponding to node $n_j$ and extending "upward" out of the page. Each of events' $e_1$, $e_2$, $e_{j-1}$ and $e_{j+1}$ ending times may be projected over to flow $n_o$'s time line, and the time difference between their ending times and the beginning of event $e_j$, $(t-t_j)$, may be calculated. These time differences may be used to calculate weights $W_{pk}^i$ using equation 3.

As illustrated in FIG. 8, the highest weight $W_{2,j}$ (e.g., closest to the upper bound of 1 for $W_{pk}^i$) is assigned to the most recent data unit arrival event $e_2$ 830 from flow $n_2$. Similarly, the lowest weight $W_{j+1,j}$ (e.g., closest to the lower bound of 0 for $W_{pk}^i$) is assigned to the least recent data unit arrival event $e_{j+1}$ 850 from flow $n_{j+1}$. It should be noted that event $p_j$ receives a weight of zero from equation 3, because there is no time lapse from itself. In this manner, a set of weights $W_{pk}^i$ is generated for each data unit arrival $e_j$ in tracefile 700 (or some batch of data within tracefile 700). Because these weights $W_{pk}^i$ correspond to a single event $e_j$, they may be termed "per-event weights."

Per-event probability vectors may be used to identify the "reaction to" probabilities for a given event (i.e., the probabilities that the given event is a "reaction to" the most recent events with other flows). Per-event probability vectors may be obtained from the per-event weights calculated above by normalizing equation 3 to obtain the following equation:

$$[p_1^e, p_2^e, \ldots p_n^e] = \frac{[W_e^1, W_e^2, \ldots W_e^n]}{\sum_{i=1}^n W_e^i} \tag{5}$$

The per-event probability vectors may provide an instantaneous measure of how likely any event is to have been caused by a certain flow. Though such "local" information may be valuable in certain situations, it may not provide the time-integrated information suitable for determining steady-state flow information and/or network topology.

A more "global" data product, "cumulative probability matrices" (CPM), may be obtained in a time-integrated manner from a given batch of data from tracefile 700. For a sequence of events, a probability matrix may be updated in an iterative manner. Convergence of this matrix reveals any underlying stepping stone connections in network 500. The set of all transmission events in a batch may be defined as C. Similarly, the set of transmission events in set C with node i as the transmitter may be defined as $C_i$. The cumulative probability, $p_{ij}$, that a flow j sends data to flow i may be defined as:

$$p_{ij} = \frac{1}{|C_i|}\sum_{e\in C_i} \frac{W_e^j}{\sum_{l=1}^n W_e^l} \tag{6}$$

where $W_e^i$, the likelihood that the event e is a reaction to a prior event from flow j, may be calculated from equation 3.

Figure 9:
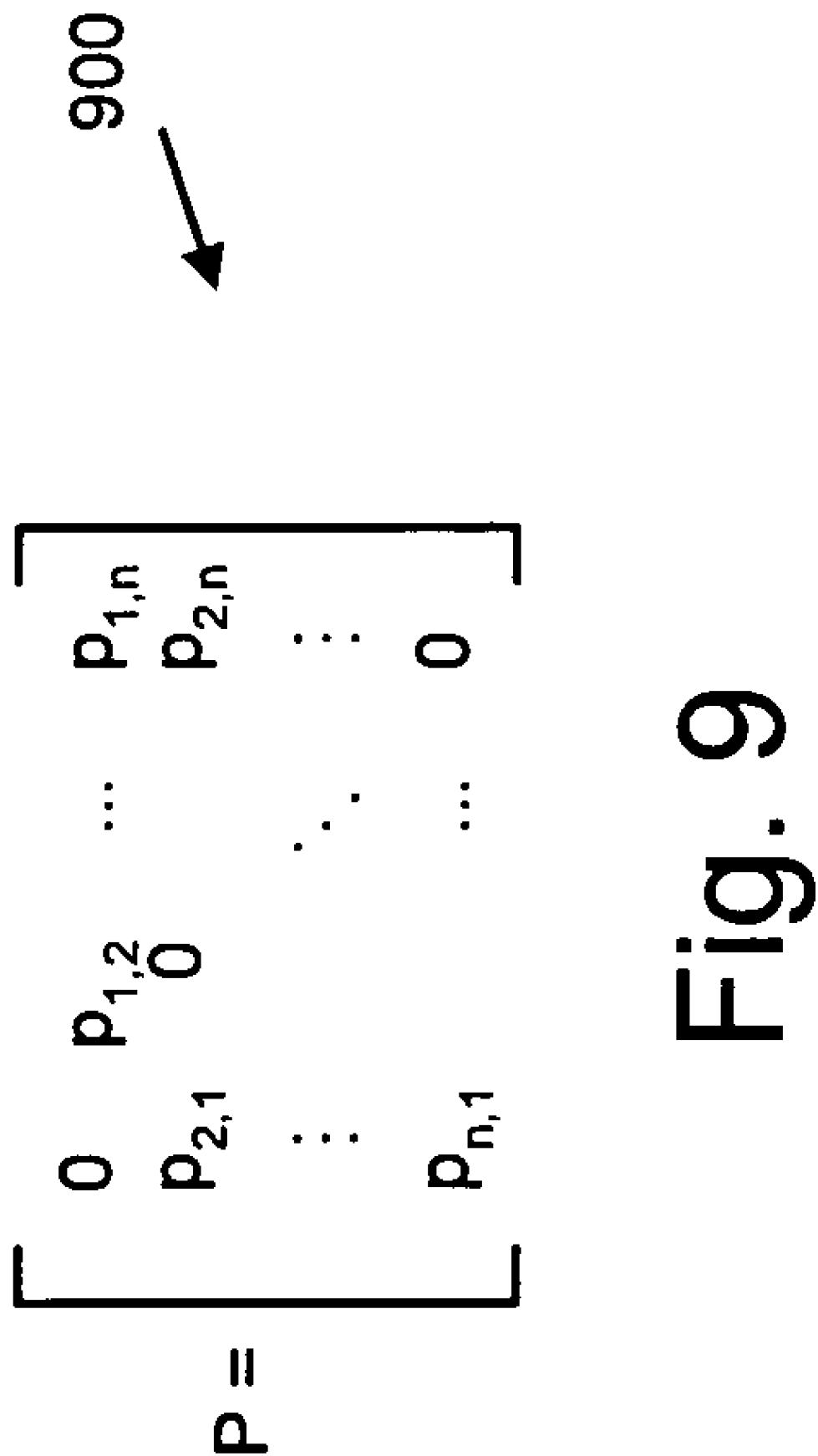
FIG. 9 illustrates a cumulative probability matrix among flows in the network of FIG. 5.

FIG. 9 illustrates a cumulative probability matrix P 900 representing interflow connections among nodes 510 in the network 500. Formation of matrix P 900 assumes that the number of flows n is bounded by a predetermined value, at least over the batch of data from tracefile 700.

Cumulative probability matrix P 900 may be incrementally generated from tracefile 700 as follows. When processing the next event e in the set of events C, for example the $m^{th}$ event of $C_i$ (i.e., the $m^{th}$ transmission from flow i in C), the $i^{th}$ row in matrix P 900 may be updated as follows:

$$p'_{ij} = \frac{1}{m}\left((m-1)p_{ij} + \frac{W_e^j}{\sum_{l=1}^n W_e^l}\right), \forall\ 1\leq j \leq n, \tag{7}$$

where $p'_{ij}$ is the new, incremented value of $p_{ij}$.

After its generation from the set of events C, the cumulative probability matrix P 900 enables at least two useful measures that may be used in establishing interflow connections. These measures may be seen by examining rows and columns of matrix P 900 as independent entities. A given row of matrix P 900, such as $(P)_{aj}$ (j=1 . . . n), may illustrate the likelihood of data flow from flow j to a flow of interest. Conversely, a given column of matrix P 900, such as $(P)_{ib}$ (i=1 . . . n), may illustrate the likelihood of data flow from a flow of interest b to the remaining flows i.

Once the cumulative probability matrix P 900 has been generated, a threshold detection operation over the matrix P 900 may produce a probable routing table among the nodes 510 in network 500 (or that portion of the network 500 that was used to generate P 900). Thus, the steady-state attack path (i.e., set of active links) of network 500 may be determined. A suitable threshold T for producing probable links may be discovered by those skilled in the art without undue experimentation. One threshold T that was found to be experimentally useful was around 0.2, but higher or lower thresholds between 0 and 1 may be used, such as thresholds in a range from about 0.1 to about 0.3.

Thus, the identity of stepping stones within an attack path of network 500 may be determined by applying a probability threshold to cumulative probability matrix P 900. The resulting set of connections occurred among nodes 510 during the period of time over which the cumulative probability matrix P 900 was iteratively formed.

FIG. 10 illustrates exemplary iterative processing to generate and update the cumulative probability matrix 900. First, a data unit arrival event (e.g., arrival event or packet of interest $e_j$) may be chosen from a data set [act 1010]. The set of most recent data unit transmissions from flows other than the flow associated with the chosen arrival event may be determined [act 1020]. This set of most recent data unit transmissions may be weighted (e.g., $W_{pk}^i$) according to the elapsed time between the data unit transmissions and the chosen arrival event [act 1030]. Equation 3 or curve/function 860, for example, may be used to accomplish this weighting of most recent arrivals, by measuring from the ending times of the arrivals.

Probability matrix 900 may be updated with the weights associated with the data unit arrival event, as described by equation 7 [act 1040]. It should be noted that the weights $W_{pk}^i$ may be normalized to generate probabilities before updating probability matrix 900. If the data set to be analyzed is not complete [act 1050], a next data unit arrival event (e.g., arrival event of interest $e_{j+1}$) may be chosen, and acts 1010-1040 may be repeated for that next data unit arrival event. Acts 1010-1040 may be repeated for all data unit arrivals in the set of data until the last arrival in the set is processed [act 1060]. Depending on network traffic, a relatively large data set (e.g., about 10 seconds worth of data unit arrival data) may need to be processed before probability matrix 900 converges to a stable state.

Figure 11A:
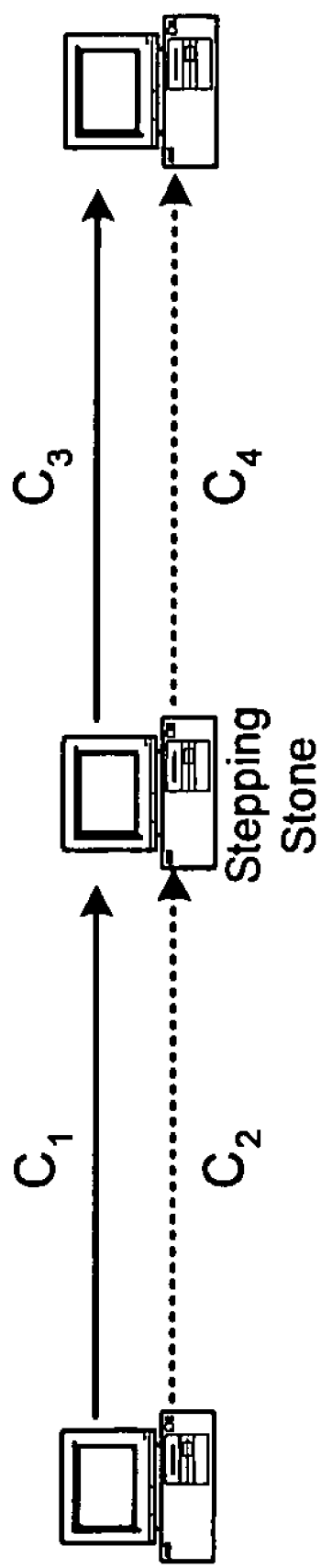
FIG. 11A illustrates an exemplary networking testing environment.
Figure 11C:
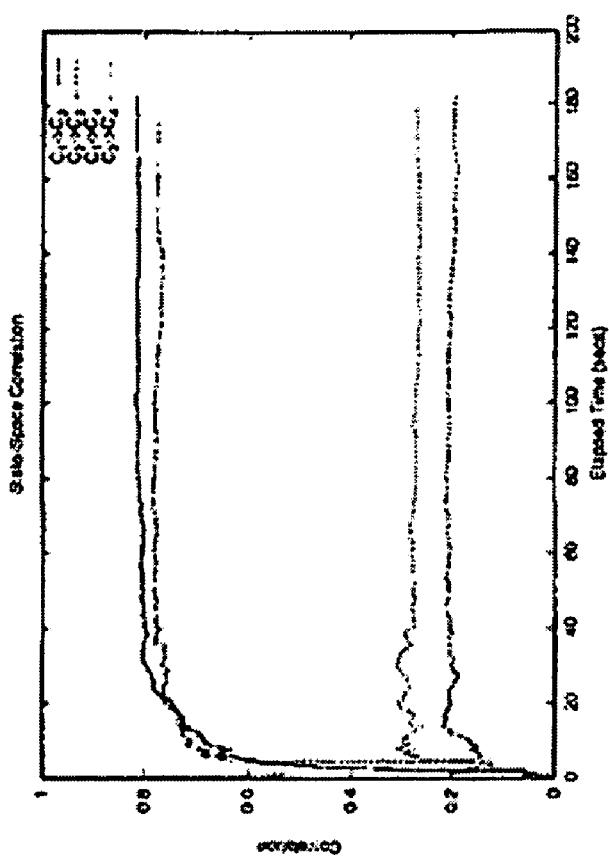
FIGS. 11B and 11C illustrate performance results for the test environment of FIG. 11A.
Figure 11B:
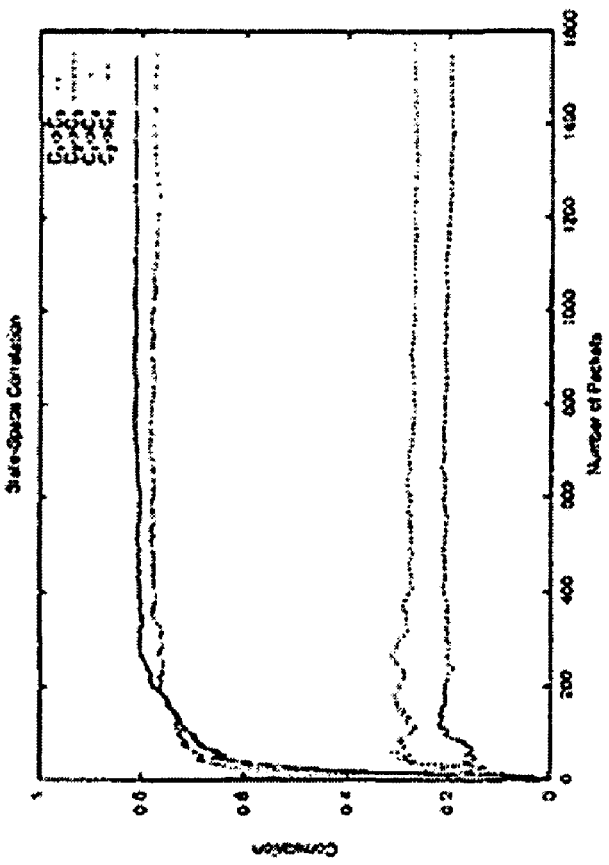

Simulations were performed to compare performance of the above-described stepping stone detection scheme by comparing the calculated link detections against corresponding "ground-truth" obtained from data used in the simulations. FIGS. 11B and 11C provide performance results of the State-Space Correlation algorithm with respect to a sample of ssh connection traffic. FIG. 11A illustrates sample ssh connection traffic used to demonstrate the performance of the stepping stone detection algorithms.

The performance results are represented in terms of a correlation metric between 0 and 1, with values closer to 1 indicating a greater likelihood that two connections are a stepping stone pair. The correlation metric is graphed against both number of packets (FIG. 11B) and elapsed time in seconds (FIG. 11C). The algorithm correctly distinguishes both stepping stone pairs—$C_1 \rightarrow C_3$ and $C_2 \rightarrow C_4$—within approximately 100 packets or 20 seconds of interactive traffic. Similar results were collected for all the connection samples to which the algorithm was applied.

The State-Space Correlation algorithm assumes that the interarrival times between a fixed event (i.e., a transmitted packet) and any other event (i.e., a subsequently transmitted packet) are approximately Poisson distributed, where X is the Poisson parameter. The current algorithm calculates the $\lambda$ constant a priori based on the pre-sampled traffic.

CONCLUSION

Methods and systems consistent with the principles of the invention may discover stepping stones within an attack path topology by examining elapsed times between one data unit or packet arrival and the most recent data unit arrivals from other flows on a per-event basis. The most recent data unit arrivals from the other flows may be weighted so that more recent data units are weighted higher than less recent data units.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

Moreover, the acts in FIGS. 6 and 10 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system, comprising:
   one or more network taps configured to obtain a data set including times of arrival and flow identifying information for data units in a network; and
   a processor configured to receive the data set and further configured to:
   identify a plurality of flows in the data set other than a flow of interest, and for each of the plurality of other flows, identify a most recent data unit arrival event of the flow received before a data unit arrival time of a data unit associated with the flow of interest;
   calculate weights for each of the plurality of other flows based on respective time differences between the data unit arrival time associated with the flow of interest and the arrival time of the most recent data unit arrival event of the respective other flow;
   calculate probability vectors based on the weights to identify respective probabilities that the data unit associated with the flow of interest is a reaction to the most recent data unit arrival event of the respective other flow; and determine whether the flow of interest identifies a stepping stone in an attack path based in part on the probability vectors of the plurality of other flows.

2. The system of claim 1, the processor further configured to update a cumulative probability matrix based on the probability vectors for the other flows, each entry of the probability matrix indicating a likelihood that a connection associated with a first one of the flows is a reaction to a connection associated with a second one of the flows.

3. The system of claim 2, the processor further configured to perform the identifying, calculating, and updating for other times of arrival and associated flows of interest in the data set.

4. The system of claim 3, wherein ending times are determined from respective times of arrival and durations of the most recent data units.

5. The system of claim 2, wherein the determining includes:
applying a threshold function to the cumulative probability matrix.

6. The system of claim 2, the processor further configured to determine correlated flows in the network from the cumulative probability matrix.

7. The system of claim 1, wherein the calculating includes:
determining the time differences based on ending times of the most recent data units.

8. The system of claim 1, wherein the calculating includes:
calculating the weights using a function of time whose value generally decreases with increasing time.

9. The system of claim 8, wherein the function is a monotonically decreasing function of time.

10. The system of claim 1, wherein calculating the probability vectors includes:
normalizing the weights to obtain a set of probabilities for the plurality of other flows.

11. A system, comprising:
a processor; and
a memory storing instructions that, when executed by the processor, cause the system to:
receive data relating to traffic over a network, the data collected from at least one network tap in communication with the network;
identify a set of times of arrival and corresponding flows for data units in the network;
determine intervening times from a time of arrival of one data unit from one flow, each intervening time being determined according to an amount of time between the time of arrival of the one data unit from the one flow and a time of arrival of a most recently arriving data unit of one of the respective other flows;
assign weights to the most recently arriving data units of the respective other flows, the weights varying inversely to the respective intervening times; and
calculate probability vectors based on the weights to identify respective probabilities that the one data unit is a reaction to the most recently arriving data unit of the respective other flow.

12. The system of claim 11, the processor further configured to:
determine the intervening times between the time of arrival of the one data unit and one most recent data unit for each of the other flows.

13. The system of claim 11, wherein the identifying includes:
identifying durations of the data units in the network.

14. The system of claim 11, wherein the determining includes:
calculating the intervening times based on the times of arrival and the durations of the most recent other data units from the other flows.

15. The system of claim 11, wherein the weights decrease exponentially with increasing intervening time.

16. The system of claim 15, wherein the respective times are measured from ends of respective data units in the set and a time of arrival of the one data unit.

17. The system of claim 15, wherein the processor is further configured to:
choose a new data unit as the one data unit; and
repeat the assigning weights and updating a probability matrix for the new data unit.

18. The system of claim 11, wherein the generating further includes:
normalizing the assigned weights to generate the routing probabilities.

19. A method of determining correlated flows in a network, comprising a computer programmed to perform the steps of:
obtaining times of arrival and corresponding flows for data units in the network;
determining intervening times from a time of arrival of one data unit from one flow, each intervening time being determined according to an amount of time between the time of arrival of the one data unit from the one flow and a time of arrival of a most recently arriving data unit of one of the respective other flows;
assigning weights to the most recently arriving data units of the respective other flows based on the respective intervening times;
calculating probability vectors based on the weights to identify respective probabilities that the one data unit is a reaction to each one of the set of data units; and
updating a cumulative probability matrix representing interflow connections in the network based on the probability vectors, each entry of the cumulative probability matrix indicating a likelihood that a connection associated with a first one of the flows is a reaction to a connection associated with a second one of the flows.

20. The method of claim 19, further comprising:
applying a threshold for producing probable links to the likelihoods of the cumulative probability matrix; and
determining correlated flows over the network according to the likelihoods of the cumulative probability matrix satisfying the threshold.

21. A non-transitory computer-readable medium that stores instructions executable by one or more processors to perform a method for determining correlated flows in a network, comprising:
instructions for obtaining a set of times of arrival and corresponding flows for data units in the network;
instructions for determining intervening times from a time of arrival of one data unit from one flow, each intervening time being determined according to an amount of time between the time of arrival of the one data unit from the one flow and a time of arrival of a most recently arriving data unit of one of the respective other flows;
instructions for assigning weights to the most recently arriving data units of the respective other flows based on the respective intervening times;
instructions for calculating probability vectors based on the weights to identify respective probabilities that the one data unit is a reaction to each one of the most recently arriving data units; and instructions for updating a cumulative probability matrix representing interflow connections in the network based on the probability vectors, each entry of the cumulative probability matrix indicating a likelihood that a connection associated with a first one of the flows is a reaction to a connection associated with a second one of the flows.

22. A system, comprising:

a data processor for a network; and a memory storing instructions that, when executed by the processor, cause the system to:

obtain a set of times of arrival and corresponding flows for data units in the network, the data units collected from at least one network tap in communication with the network;

determine intervening times from a time of arrival of one data unit from one flow, each intervening time being determined according to an amount of time between the time of arrival of the one data unit from the one flow and a time of arrival of a most recently arriving data unit of one of the respective other flows;

assign weights to the most recently arriving data units of the respective other flows based on the respective intervening times;

calculate probability vectors based on the weights to identify respective probabilities that the one data unit is a reaction to each one of the set of data units; and update a cumulative probability matrix representing interflow connections in the network based on the probability vectors, each entry of the cumulative probability matrix indicating a likelihood that a connection associated with a first one of the flows is a reaction to a connection associated with a second one of the flows.

* * * * *